US011929026B2

(12) United States Patent
Ryu et al.

(10) Patent No.: US 11,929,026 B2
(45) Date of Patent: Mar. 12, 2024

(54) DISPLAY DEVICE COMPRISING PIXEL DRIVING CIRCUIT

(71) Applicant: LG Display Co., Ltd., Seoul (KR)

(72) Inventors: SungBin Ryu, Gyeonggi-do (KR); JaeYong You, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/986,614

(22) Filed: Nov. 14, 2022

(65) Prior Publication Data

US 2023/0215361 A1 Jul. 6, 2023

(30) Foreign Application Priority Data

Dec. 31, 2021 (KR) ........................ 10-2021-0194805

(51) Int. Cl.
*G09G 3/32* (2016.01)
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/0294* (2013.01); *G09G 2310/08* (2013.01)

(58) Field of Classification Search
None
See application file for complete search history.

(56) References Cited

U.S. PATENT DOCUMENTS

2016/0351121 A1* 12/2016 Kim ..................... G09G 3/3233

FOREIGN PATENT DOCUMENTS

KR 10-2019-0057564 A 5/2019
KR 10-2020-0074522 A 6/2020

* cited by examiner

*Primary Examiner* — Joseph R Haley
(74) *Attorney, Agent, or Firm* — Birch, Stewart, Kolasch & Birch, LLP

(57) ABSTRACT

A display device can include a light emitting element, and a pixel driving circuit connected to the light emitting element and configured to include first to fourth nodes. The pixel driving circuit can include a driving transistor connected to the first to third nodes, a plurality of switching transistors, and a storage capacitor. Among the plurality of switching transistors, the switching transistor connected to a source node of the driving transistor is controlled by a second scan signal, and is configured to apply a data voltage to the source node of the driving transistor. The second scan signal can be applied one or more times during one frame.

17 Claims, 7 Drawing Sheets

DISPLAY DEVICE COMPRISING PIXEL DRIVING CIRCUIT

CROSS-REFERENCE TO RELATED APPLICATIONS

This application claims priority under 35 U.S.C. § 119(a) to Korean Patent Application No. 10-2021-0194805 filed in the Republic of Korea on Dec. 31, 2021, the entire contents of which are hereby expressly incorporated by reference into the present application.

BACKGROUND

Technical Field

The present disclosure relates to a display device comprising a pixel driving circuit.

Discussion of the Related Art

With the development of information technology, a market of a display device, which is a connection medium between a user and information, increases. Various forms of communication have been actively developed beyond the transfer of text-centric information between users. According to the type of information changes, the performance of display device for displaying information has also been developed.

Accordingly, the display devices such as an organic light emitting display device, a micro LED (light emitting diode) display device, a liquid crystal display device, and a quantum dot display device have been variously used, and a high definition display device for increasing the sharpness of information has been actively studied and developed.

A display device includes a display panel including a plurality of subpixels, a driving circuit for supplying a signal for driving the display panel, and a power supply portion for supplying power to the display panel. The driving circuit includes a gate driving circuit for supplying a gate signal to the display panel and a data driving circuit for supplying a data signal to the display panel.

For example, when the gate signal and the data signal are supplied to the subpixel of the display device, the display device can display an image by allowing a light emitting element of the selected subpixel to emit light. The light emitting element can be implemented based on an organic material or an inorganic material.

The display device displays an image based on light generated from the light emitting element in the subpixel, whereby it has various advantages. However, in order to improve a picture quality of the image, it is needed to improve an accuracy of a pixel driving circuit for controlling a light emission in the subpixel. For example, the accuracy of the pixel driving circuit can be improved by compensating for a threshold voltage of a driving transistor included in the pixel driving circuit.

SUMMARY OF THE DISCLOSURE

The pixel driving circuit of a display device divides one horizontal period 1H into an initialization period, a sampling period, a holding period, and an emission period, and compensates for the deviation of the threshold voltage of the driving transistor in the sampling period.

As the resolution and/or driving frequency of the display device is increased, a sampling time may not be sufficiently secured, and an image quality defect such as a stain, an afterimage, and a cross talk of the screen can be generated.

In order to address the above-mentioned limitation, an image quality defect such as a stain, an afterimage, and a crosstalk of a screen can be improved by extending a sampling time of the pixel driving circuit. However, when a black signal is applied like a low grayscale, the light emitting device may not undesirably emit light, and accordingly, the light emitting device can have a limitation in reducing the voltage of the source node of the driving transistor while securing a sufficient sampling time.

Accordingly, an object of the present disclosure is to provide a display device comprising a pixel driving circuit capable of sufficiently securing a sampling period and reducing a voltage of a source node of a driving transistor before an emission period arrives.

In accordance with an aspect of the present disclosure, the above and other objects can be accomplished by the provision of a display device comprising a light emitting element, and a pixel driving circuit connected to the light emitting element and configured to include first to fourth nodes, wherein the pixel driving circuit includes a driving transistor connected to the first to third nodes, a first transistor connected to a first scan signal line and connected between the first node and the second node, a second transistor connected to a second scan signal line and connected between the third node and a data line, a third transistor connected to the first scan signal line and connected between the first node and an initialization voltage line, a fourth transistor connected to a second emission control line and connected between the second node and a first driving voltage line, a fifth transistor connected to a first emission control line and connected between the third node and the fourth node, and a storage capacitor disposed between the first node and the fourth node, wherein the second scan signal is applied one or more times through the second scan signal line during one frame period.

In addition to the effects of the present disclosure as mentioned above, additional advantages and features of the present disclosure will be clearly understood by those skilled in the art from the above description of the present disclosure.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE EMBODIMENTS

Figure 1:
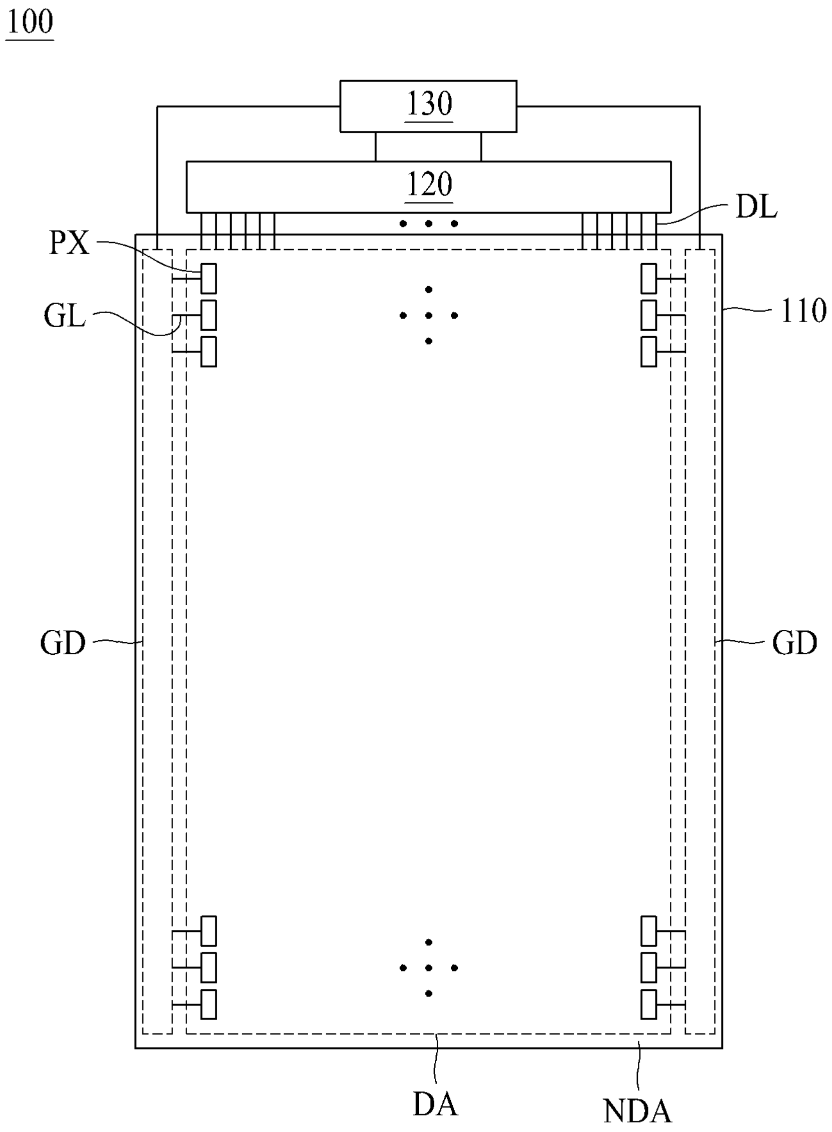
FIG. 1 is a block diagram of a display device according to an embodiment of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted or may be provided briefly.

In a case where ‘comprise’, ‘have’, and ‘include’ described in the present specification are used, another part can be added unless ‘only~’ is used. The terms of a singular form can include plural forms unless referred to the contrary.

In construing an element, the element is construed as including an error range although there is no explicit description.

In describing a position relationship, for example, when the position relationship is described as ‘upon~’, ‘above~’, ‘below~’, and ‘next to~’, one or more portions can be arranged between two other portions unless ‘just’ or ‘direct’ is used.

In describing a temporal relationship, for example, when the temporal order is described as “after,” “subsequent,” “next,” and “before,” a case which is not continuous can be included, unless “just” or “direct” is used.

It will be understood that, although the terms “first”, “second”, etc. can be used herein to describe various elements, these elements should not be limited by these terms. These terms are only used to partition one element from another, and may not define any order or sequence. For example, a first element could be termed a second element, and, similarly, a second element could be termed a first element, without departing from the scope of the present invention.

The term “at least one” should be understood as including any and all combinations of one or more of the associated listed items. For example, the meaning of “at least one of a first item, a second item, and a third item” denotes the combination of all items proposed from two or more of the first item, the second item, and the third item as well as the first item, the second item, or the third item.

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Hereinafter, a preferred embodiment of a pixel driving circuit and a display device comprising the same according to the present disclosure will be described in detail with reference to the accompanying drawings. Wherever possible, the same reference numbers will be used throughout the drawings to refer to the same or like parts. Since a scale of each of elements shown in the accompanying drawings is different from an actual scale for convenience of description, the present disclosure is not limited to the shown scale.

In the present specification, a pixel driving circuit and a gate driving circuit formed on a substrate of a display panel can be implemented as N-type or P-type transistors. For example, the transistor can be implemented as the transistor with N-type or P-type Metal Oxide Semiconductor Field Effect Transistor (MOSFET) structure. The transistor is a three-electrode element including a gate electrode, a source electrode, and a drain electrode. The source electrode and the drain electrode of the transistor are not fixed, and the source electrode and the drain electrode of the transistor can be changed according to an applied voltage. For example, one of the source electrode or the drain electrode can be referred to as a first source/drain electrode, and the other can be referred to as a second source/drain electrode, but not limited thereto.

A gate signal of the transistor used as switching elements can swing between a gate-on voltage and a gate-off voltage. The gate-on voltage is set to a voltage at which the transistor is turned-on, and the gate-off voltage is set to a voltage at which the transistor is turned-off. In the case of N-type transistor, the gate-on voltage can be a gate high voltage VGH having a first voltage level, and the gate-off voltage can be a gate low voltage VGL having a second voltage level lower than the gate high voltage VGH. In the case of P-type transistor, the gate-on voltage can be a gate low voltage VGL having a second voltage level, and the gate-off voltage can be a gate high voltage VGH having a first voltage level.

Between the gate driving circuit and the pixel driving circuit, there can be the first gate control line, the second gate control line, the third gate control line, and the fourth gate control line.

FIG. 1 is a block diagram of a display device according to an embodiment of the present disclosure.

Referring to FIG. 1, a display device 100 according to the embodiment of the present disclosure can include a display panel 110 in which a plurality of data lines DL and a plurality of gate lines GL are disposed and a plurality of pixels PX connected to the plurality of data lines DL and the plurality of gate lines GL are arranged, and driving circuits for providing a driving signal to the display panel 110.

Although it is illustrated that the plurality of pixels PX are arranged in a matrix configuration and constitute a pixel array, the present disclosure is not limited thereto, and the pixels can be arranged in the various configurations.

The driving circuit can include a data driving circuit 120 for providing a data signal to the plurality of data lines DL, a gate driving circuit GD for providing a gate signal to the plurality of gate lines GL, a controller 130 (or timing controller) for controlling the data driving circuit 120 and the gate driving circuit GD.

The display panel 110 can include a display area DA for displaying an image and a non-display area NDA disposed in the periphery of the display area DA. In the display area DA, there are the plurality of pixels PX, the data line DL for providing the data signal to the plurality of pixels PX and the gate line GL for providing the gate signal.

The plurality of gate lines GL disposed in the display area DA can extend to the non-display area NDA and can be electrically connected to the gate driving circuit GD. The gate line GL electrically connects the plurality of pixels PX disposed in the first direction (or row direction) to the gate driving circuit GD. Additionally, gate driving lines required to generate various gate signals or to drive the plurality of pixels PX can be disposed in the non-display area NDA. For example, the gate driving lines can include one or more high-level gate voltage lines for supplying the high-level gate voltage to the gate driving circuit GD, one or more low-level gate voltage lines for supplying the low-level gate voltage to the gate driving circuit GD, a plurality of clock lines for supplying a plurality of clock signals to the gate driving circuit GD, and one or more start lines for supplying one or more start signals to the gate driving circuit GD.

The plurality of data lines DL disposed in the display area DA can extend to the non-display area NDA and can be electrically connected to the data driving circuit 120. The data line DL can electrically connect the data driving circuit 120 to the plurality of pixels PX disposed in the second direction (or column direction) crossing the first direction, can be implemented as a single wire, or can be implemented by connecting a plurality of wirings through a contact hole using a link line.

In the display panel 110, the plurality of data lines DL and the plurality of gate lines GL are disposed together with the pixel array. As described above, the plurality of data lines DL and the plurality of gate lines GL can be arranged in rows or columns, respectively. For convenience of description, it is assumed that the plurality of data lines DL are arranged in columns, and the plurality of gate lines GL are arranged in rows.

The controller 130 (or timing controller) can start scanning the data signal according to the timing implemented in each frame, convert input image data input from the outside in accordance with a data signal format used in the data driving circuit 120, output the converted image data, and control the data driving circuit 120 in synchronization with the scan signal.

The controller 130 can receive timing signals including a vertical synchronization signal, a horizontal synchronization signal, an input data enable signal, a clock signal, etc. together with the input image data from the outside. The controller 130 receiving the timing signals can generate and output control signals for controlling the data driving circuit 120 and the gate driving circuit GD.

For example, the controller 130 can output various data control signals including a source start pulse, a source sampling clock, a source output enable signal, and the like to control the data driving circuit 120. The source start pulse can control the data sampling start timing of one or more data signal generation circuits constituting the data driving circuit 120. The source sampling clock is a clock signal for controlling the sampling timing of data in each of the data signal generation circuits. The source output enable signal can control the output timing of the data driving circuit 120.

In addition, the controller 130 can output a gate control signal including a gate start pulse, a gate shift clock, a gate output enable signal, etc. to control the gate driving circuit GD. The gate start pulse can control the operation start timing of one or more gate signal generation circuits constituting the gate driving circuit GD. The gate shift clock, which is a clock signal commonly input to one or more gate signal generation circuits, can control the shift timing of a scan signal. The gate output enable signal designates timing information of one or more gate signal generation circuits.

The controller 130 can be a timing controller used in a typical display device technology or a control device including a timing controller to further perform other control functions.

The controller 130 can be implemented as a separate component from the data driving circuit 120 or can be integrated with the data driving circuit 120 and implemented as one integrated circuit.

The data driving circuit 120 can include one or more data signal generation circuits. The data signal generation circuit can include a shift register, a latch circuit, a digital-to-analog converter, an output buffer, and the like. The data signal generation circuit can further include an analog-to-digital converter, if needed.

The data signal generation circuit can be connected to a bonding pad of the display panel 110 by a tape automated bonding (TAB) method, a chip on glass (COG) method, or a chip on panel (COP) method, or can be directly disposed on the display panel 110 or integrated with the display panel 110. Further, the plurality of data signal generation circuits can be implemented in a chip on film (COF) method mounted on a source-circuit film connected to the display panel 110.

The gate driving circuit GD sequentially supplies the gate signal to the plurality of gate lines GL, thereby driving the plurality of pixels PX connected to the plurality of gate lines GL. The gate driving circuit GD can include a shift register, a level shifter, and the like.

The gate driving circuit GD can be connected to the bonding pad of the display panel 110 by a tape automated bonding (TAB) method, a chip on glass (COG) method, or a chip on panel (COP) method, or can be implemented as a gate in panel (GIP) method and can be directly disposed on the display panel 110. Further, the plurality of gate signal generation circuits can be mounted on a gate-circuit film connected to the display panel 110 and can be implemented in a chip on film (COF) method. The gate driving circuit GD can include the plurality of gate signal generating circuits, and the plurality of gate signal generating circuits can be implemented in a GIP method and can be disposed in the non-display area NDA of the display panel 110.

Under the control of the controller 130, the gate driving circuit GD can sequentially supply the gate signal having the gate high voltage VGH with the first voltage level for turning on or off the transistor or the gate signal having the gate low voltage VGL with the second voltage level for turning on or off the transistor to the plurality of gate lines GL. When the signal is provided to the specific gate line by the gate driving circuit GD, the data driving circuit 120 can convert the image data received from the controller 130 into an analog data signal and supply the analog data signal to the plurality of data lines DL.

The data driving circuit 120 can be disposed at one side of the display panel 110. For example, the data driving circuit 120 can be disposed at an upper side, a lower side, a left side, or a right side of the display panel 110. In addition, the data driving circuit 120 can be disposed at both sides of the display panel 110 according to a driving method, a panel design method, or the like. For example, the data driving circuit 120 can be disposed at the upper side and the lower side of the display panel 110 or can be disposed at the left side and the right side of the display panel 110.

The gate driving circuit GD can be disposed at one side of the display panel 110. For example, the gate driving circuit GD can be disposed at an upper side, a lower side, a left side, or a right side of the display panel 110. In addition, the gate driving circuit GD can be disposed at both sides of the display panel 110 according to a driving method, a panel design method, or the like. For example, the gate driving circuit GD can be disposed at the upper side and the lower side of the display panel 110 or can be disposed at the left side and the right side of the display panel 110. The gate driving circuit GD can be formed in the left and/or right non-display area NDA of the substrate together with the process of manufacturing the thin film transistor of the pixel PX, and can operate according to a single feeding method to supply the gate signal to each of the plurality of gate lines GL. Alternatively, the gate driving circuit GD can be formed in the left and right non-display areas NDA of the substrate, respectively, and can operate according to a double feeding method to supply the gate signal to each of the plurality of gate lines GL. Alternatively, the gate driving circuit GD can be formed in each of the left and right non-display areas NDA of the substrate, respectively, and can operate according to an interlacing method of the double feeding method to supply the gate signal to each of the plurality of gate lines GL.

It is illustrated that the plurality of gate lines GL disposed in the display panel 110 are disposed in the first direction (or row direction), and the plurality of data lines DL are disposed in the second direction (or column direction) crossing the first direction. Thus, it is assumed that the data driving circuit 120 is disposed at the upper side of the display panel 110, and the gate driving circuit GD is disposed at the left side and the right side of the display panel 110.

The plurality of gate lines GL disposed on the display panel 110 can include a plurality of first gate control lines, a plurality of second gate control lines, and a plurality of third gate control lines. The first gate control line, the second gate control line, and the third gate control line are wires transmitting different types of gate signals to gate electrodes of the different transistors. For example, the first gate control line can be a wire for transmitting a first emission control signal, the second gate control line can be a wire for transmitting a second emission control signal, and the third gate control line can be a wire for transmitting a scan signal.

Accordingly, the gate driving circuit GD can include a plurality of first emission control driving circuits configured to output first emission control signals to the first gate control line of the gate line GL, a plurality of second emission control driving circuits configured to output second emission control signals to the second gate control line, and a plurality of scan driving circuits configured to output scan signals to the third gate control line.

A period in which the gate signal including the first and second emission control signals and the scan signal and the data signal are applied once to all the pixels PX disposed in the second direction (or column direction) of the display area DA can be referred to as one frame period. The one frame period can be divided into a scan period in which data is scanned in the pixels PX of each of the gate lines GL connected thereto and the data of input image is written to each of the pixels PX, and a light emission period in which the pixels PX are turned on according to the first and second emission control signals after the scan period. In the light emission period, the pixels PX can be repeatedly turned on and off. The scan period can include an initialization period, a sampling period, and the like. The sampling period can include a programming period. During the scan period, nodes included in the pixel driving circuit are initialized, the compensation of the threshold voltage of the driving transistor is performed, and the charging of the data voltage is performed. During the light emission period, the light emitting operation is performed. The scan period is only a few horizontal scan periods, and the light emission period occupies most of the one frame period.

Figure 2:
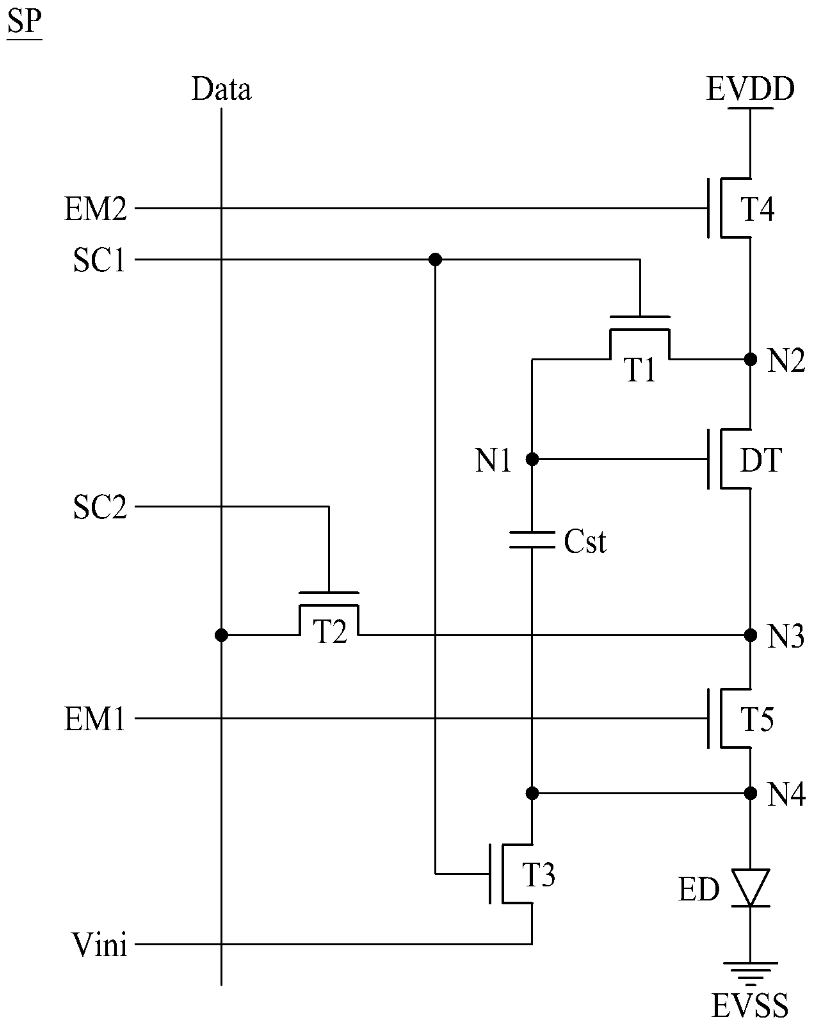
FIG. 2 is a circuit diagram of a pixel driving circuit and a light emitting device according to an embodiment of the present disclosure.

FIG. 2 is a circuit diagram of a pixel driving circuit and a light emitting element according to the embodiment of the present disclosure.

Referring to FIG. 2, a display device 100 according to the embodiment of the present disclosure can include a display panel 110, wherein the display panel 110 can include a plurality of subpixels SP which constitute one unit pixel PX. Each of the plurality of subpixels SP can include a light emitting element ED and a pixel driving circuit for driving the light emitting element ED.

The pixel driving circuit of the subpixel SP can be configured with a 6T1C, but not limited thereto. A transistor disposed in the pixel driving circuit can be an N-type transistor, but not limited thereto. The pixel driving circuit of the subpixel SP can be configured with a P-type transistor or an N-type and P-type transistor.

The pixel driving circuit of the subpixel SP can include a driving element for supplying a driving current to the light emitting element ED, a scan element for transmitting a voltage Data and Vini required to drive the display device to the subpixel SP at a predetermined timing according to a scan signal, a light emission control element for controlling whether the light emitting element ED emits light, and a storage capacitor Cst for storing the voltage Data and Vini required to drive the display device.

The driving element can include a driving transistor DT. The scan element can include a first transistor T1 (or first switching transistor), a second transistor T2 (or second switching transistor), and a third transistor T3 (or third switching transistor). The light emission control element can include a fourth transistor T4 (or first emission control transistor) and a fifth transistor T5 (or second emission control transistor).

The light emitting element ED can include a first electrode (anode electrode or pixel electrode) and a second electrode (cathode electrode or common electrode). The first electrode can correspond to the fourth node N4 or can be connected to the fourth node N4. A second driving voltage EVSS (or common voltage), which is a low potential voltage, can be applied to the second electrode. For example, the light emitting element ED can be disposed between the fourth node N4 and a line to which the second driving voltage EVSS is applied, and can be electrically connected thereto. For example, the light emitting element ED can be an organic light emitting diode OLED, a light emitting diode LED, or a quantum dot light emitting diode QLED.

The driving transistor DT can be connected to the first node N1, the second node N2, and the third node N3, and can be controlled according to the voltage of the first node N1. The driving transistor DT can include a gate electrode, a drain electrode (or first source/drain electrode), and a source electrode (or second source/drain electrode). A gate electrode (or gate node) of the driving transistor DT can be connected to the first node N1, a drain electrode (or drain node) can be connected to the second node N2, and a source electrode (or source node) can be connected to the third node N3. For example, a first driving voltage EVDD, which is a high potential voltage, can be applied to the drain electrode of the driving transistor DT. A source electrode of the driving transistor DT can be electrically connected to the first electrode (or anode electrode) of the light emitting element ED.

The first transistor T1 (or first switching transistor) can be controlled by the first scan signal SC1 and can be connected between the first node N1 and the second node N2. The first transistor T1 can include a gate electrode, a drain electrode (or first source/drain electrode), and a source electrode (or second source/drain electrode). The gate electrode (or gate node) of the first transistor T1 can be applied with a first scan signal SCAN1, the drain electrode (or drain node) can be connected to the second node N2, and the source electrode (or source node) can be connected to the first node N1.

The second transistor T2 (or second switching transistor) can be controlled by the second scan signal SC2, and can be connected between the third node N3 and a line to which the data voltage Data is applied. The second transistor T2 can include a gate electrode, a drain electrode (or first source/drain electrode), and a source electrode (or second source/drain electrode). The gate electrode (or gate node) of the second transistor T2 can be applied with the second scan signal SC2, the drain electrode (or drain node) can be applied with the data voltage Data, and the source electrode (or source node) can be connected to the third node N3.

The third transistor T3 (or third switching transistor) can be controlled by the first scan signal SC1, and can be connected between a line to which an initialization voltage Vini is applied and the fourth node N4. The third transistor T3 can include a gate electrode, a drain electrode (or first source/drain electrode), and a source electrode (or second source/drain electrode). The gate electrode (or gate node) of the third transistor T3 can be applied with the first scan signal SC1, the drain electrode (or drain node) can be applied with the initialization voltage Vini, and the source electrode (or source node) can be connected to the fourth node N4.

The storage capacitor Cst can be connected between the first node N1 and the fourth node N4. The storage capacitor Cst can store and maintain the data voltage Data for one frame.

The fourth transistor T4 (or first emission control transistor) can be controlled by the second emission control signal EM2, and can be connected between a line to which the first driving voltage EVDD, which is a high potential voltage, is applied, and the second node N2. The fourth transistor T4 can include a gate electrode, a drain electrode (or first source/drain electrode), and a source electrode (or second source/drain electrode). The gate electrode (or gate node) of the fourth transistor T4 can be applied with the second emission control signal EM2, the drain electrode (or drain node) can be applied with the first driving voltage EVDD, and the source electrode (or source node) can be connected to the second node N2.

The fifth transistor T5 (or second emission control transistor) can be controlled by the first emission control signal EM1, and can be connected between the third node N3 and the fourth node N4. The fifth transistor T5 can include a gate electrode, a drain electrode (or first source/drain electrode), and a source electrode (or second source/drain electrode). The gate electrode (or gate node) of the fifth transistor T5 can be applied with the first emission control signal EM1, the drain electrode (or drain node) can be connected to the third node N3, and the source electrode (or source node) can be connected to the fourth node N4.

Figure 3:
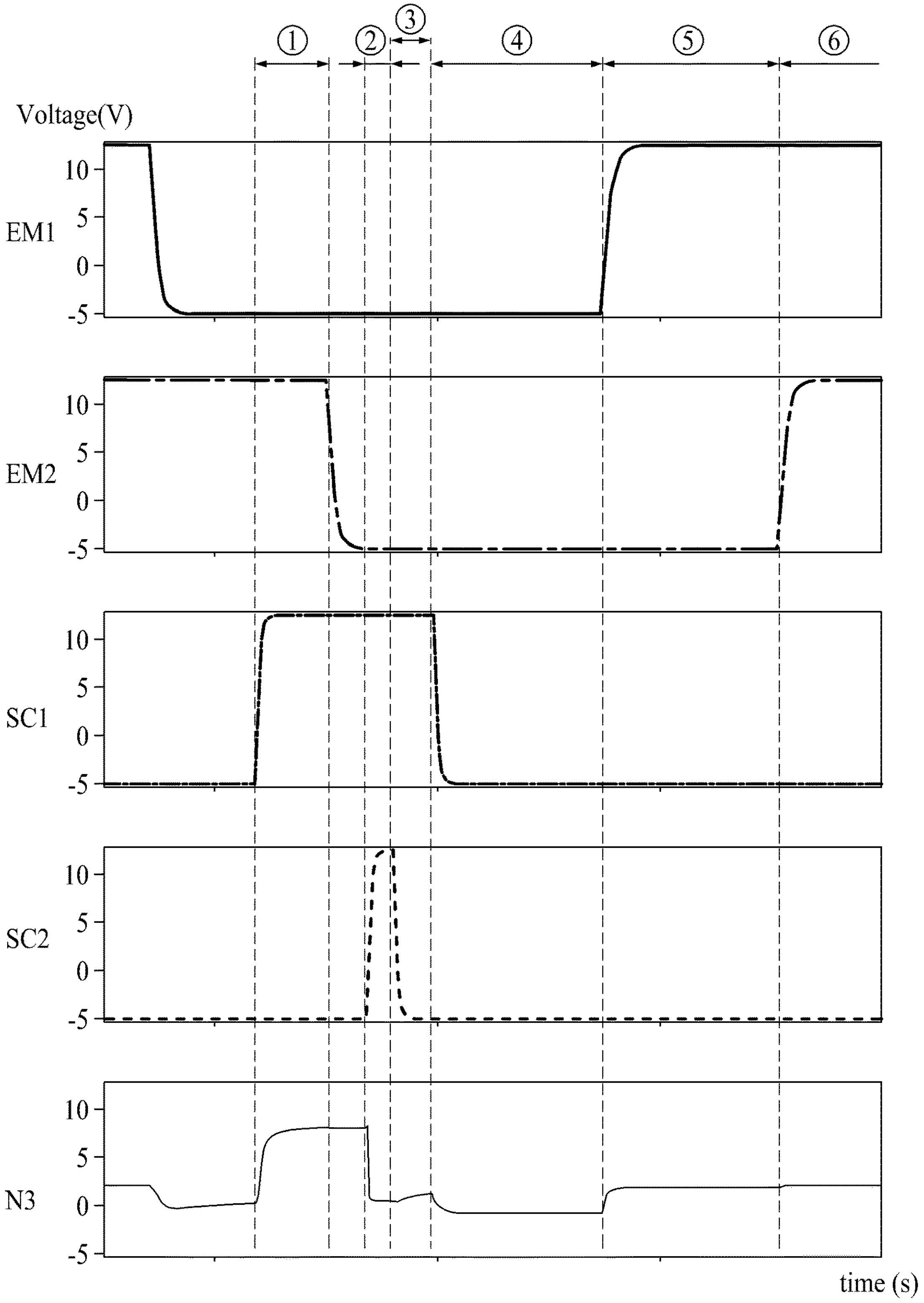
FIG. 3 is a waveform diagram of the gate signals of a pixel driving circuit and a voltage of a specific node according to an embodiment of the present disclosure.

FIG. 3 is a waveform diagram of gate signals of a pixel driving circuit and a voltage of a specific node according to one embodiment of the present disclosure.

Referring to FIG. 3 in connection with FIG. 2, the pixel driving circuit according to one embodiment of the present disclosure can be driven while being divided into a first period ①, a second period ②, a third period ③, a fourth period ④, a fifth period ⑤, and a sixth period ⑥. For example, each of the subpixels SP arranged in the (n)th horizontal line can be written with the data voltage Data through the first to sixth periods ①, ②, ③, ④, ⑤, and ⑥. The time of each of the first to sixth periods ①, ②, ③, ④, ⑤, and ⑥ can be varied according to the embodiment of the present disclosure, but not limited thereto.

The gate signals input to the pixel driving circuit can include a first emission control signal EM1, a second emission control signal EM2, a first scan signal SC1, and a second scan signal SC2, which are applied through the gate lines GL.

The first emission control signal EM1 can have a gate high voltage of a first voltage level in the fifth and sixth ⑤ and ⑥, and can have a gate low voltage of a second voltage level different from the first voltage level in the first to fourth periods ①, ②, ③, and ④.

The second emission control signal EM2 can have the gate high voltage of the first voltage level in the first and sixth periods ① and ⑥, and can have the gate low voltage of the second voltage level in the second to fifth periods ②, ③, ④, and ⑤.

The first scan signal SC1 can have the gate high voltage of the first voltage level in the first to third periods ①, ②, and ③, and can have the gate low voltage of the second voltage level in the fourth to sixth periods ④, ⑤, and ⑥.

The second scan signal SC2 can have the gate high voltage of the first voltage level in the second period ②, and can have the gate low voltage of the second voltage level in the first and third to sixth periods ①, ③, ④, ⑤, and ⑥.

When the first period ① starts, the first scan signal SC1 rises to have the gate high voltage, the second emission control signal EM2 is maintained at the gate high voltage, and the first emission control signal EM1 and the second scan signal SC2 can be maintained in the state of the gate low voltage.

During the first period ①, the second emission control signal EM2 is maintained in the state of the gate high voltage, whereby the fourth transistor T4 is turned-on. According as the first scan signal SC1 is changed to the gate high voltage, the first transistor T1 is turned-on so that the first driving voltage EVDD can be applied to the first node N1, which is the gate node of the driving transistor DT, through the fourth transistor T4 and the first transistor T1. Accordingly, the driving transistor DT can be turned-on.

Further, during the first period ①, according as the first scan signal SC1 is changed to the gate high voltage, the third transistor T3 is turned-on, and the initialization voltage Vini can be applied to the fourth node N4 through the third transistor T3.

Accordingly, the anode electrode of the light emitting element ED connected to the fourth node N4 can be initialized by the initialization voltage Vini, and the first driving voltage EVDD and the initialization voltage Vini can be applied to both ends of the storage capacitor Cst connected between the first node N1 and the fourth node N4.

When the second period ② starts, the second scan signal SC2 rises to have the gate high voltage, the first scan signal SC1 is maintained at the gate high voltage, and the first emission control signal EM1 is maintained in the state of the gate low voltage, and the second emission control signal EM2 can fall to the gate low voltage.

During the second period ②, the first scan signal SC1 is maintained in the state of the gate high voltage, whereby the first transistor T1 and the third transistor T3 are turned-on. According as the second scan signal SC2 is changed to the gate high voltage, the second transistor T2 is turned-on so that the data voltage Data can be applied to the third node N3, which is the source node of the driving transistor DT, through the second transistor T2.

Since the driving transistor DT is in a diode-connection state in which the first node N1 and the second node N2 are connected, the sampling of the threshold voltage Vth of the driving transistor DT starts, whereby the voltage of the first node N1 is increased to be the data voltage Data or higher.

When the third period ③ starts, the first scan signal SC1 is maintained in the state of the gate high voltage, whereby the second scan signal SC2 falls to the gate low voltage, and the first and second emission control signals EM1 and EM2 can be maintained in the state of the gate low voltage.

During the third period ③, while the second scan signal SC2 is converted into the state of the gate low voltage, the first scan signal SC1 is maintained in the state of the gate high voltage, and the diode-connection state in which the first node N1 and the second node N2 of the driving transistor DT are connected is maintained, whereby the sampling period of the threshold voltage Vth of the driving transistor DT is increased. Accordingly, the gate node of the driving transistor DT can be in the state of the sum voltage of the data voltage Data and the threshold voltage Vth of the driving transistor DT, and the voltage of the floated third node N3 can rise to a predetermined level while the second transistor T2 is turned-off.

Further, during the third period ③, the storage capacitor Cst can be charged by the potential difference between the sum voltage of the data voltage Data and the threshold voltage Vth and the initialization voltage Vini.

When the fourth period ④ starts, the first scan signal SC1 falls to the gate low voltage, and the first and second emission control signals EM1 and EM2 and the second scan signal SC2 can be maintained in the state of the gate low voltage. During the fourth period ④, all of the first to fifth transistors T1, T2, T3, T4, and T5 in the pixel driving circuit can be turned-off.

Accordingly, each of the first node N1, the second node N2, the third node N3, and the fourth node N4, which are sampled or written in the second and third periods ② and ③, can be floated, and the voltage of each node can be maintained as it is.

When the fifth period ⑤ starts, the first and second scan signals SC1 and SC2 and the second emission control signal EM2 can be maintained in the state of the gate low voltage, and the first emission control signal EM1 can rise to have the gate high voltage.

During the fifth period ⑤, according as the first emission control signal EM1 is changed to the gate high voltage, the fifth transistor T5 can be turned-on. At this time, the voltage of the fourth node N4 connected to the anode electrode of the light emitting element ED can be boosted while the potential difference (Data+Vth−Vini) between both ends of the storage capacitor Cst is maintained.

When the boosted voltage of the fourth node N4 is equal to or greater than the voltage value at which the driving current can flow through the light emitting element ED, the light emitting element ED can emit light. The minimum voltage value through which the driving current can flow through the light emitting element ED can be a voltage (EVSS+EVth) corresponding to a value which is high by the threshold voltage EVth of the light emitting element ED in the second driving voltage EVSS. In this case, when the applied data voltage Data is a black signal, the boosted voltage of the fourth node N4 does not exceed the threshold voltage EVth, so that the light emitting element ED may not emit light.

When the sixth period ⑥ starts, the second emission control signal EM2 rises to have the gate high voltage, whereby the first emission control signal EM1 is maintained at the gate high voltage, and the first and second scan signals SC1 and SC2 are maintained in the state of the gate low voltage.

During the sixth period ⑥, according as the second emission control signal EM2 is changed to the gate high voltage, whereby the fourth transistor T4 can be turned-on. Accordingly, the driving current can be supplied to the light emitting element ED through the fourth transistor T4, the driving transistor DT, and the fifth transistor T5 so that the light emitting element ED can emit light. As described above, when the applied data voltage Data is the black signal, the boosted voltage of the fourth node N4 does not exceed the threshold voltage threshold EVth of the light emitting element ED, whereby the light emitting element ED may not emit light.

According to one embodiment of the present disclosure, as the gate high voltage of the first scan signal SC1 is maintained for a predetermined period of time in the third period ③, a period in which the threshold voltage Vth of the driving transistor DT is sampled can be expanded, thereby overcoming defects of image quality such as stain, afterimage, and crosstalk of a screen.

According to one embodiment of the present disclosure, when the data voltage Data is a signal representing a grayscale, picture quality can be improved owing to the expansion of sampling period. However, if the data voltage Data is the black signal representing a black grayscale, the voltage of the third node N3 of the driving transistor DT can be raised at a small level due to the expansion of sampling period, whereby the light emitting element ED can emit light even by the black signal.

Accordingly, the inventors of the present disclosure have invented a display device including a pixel driving circuit capable of preventing a light emitting element ED from being undesirably emitted when a black signal is applied by an expansion of a sampling period. Hereinafter, a display device including a pixel driving circuit with improved black grayscale characteristics will be described with reference to FIGS. 4 to 7.

Figure 4:
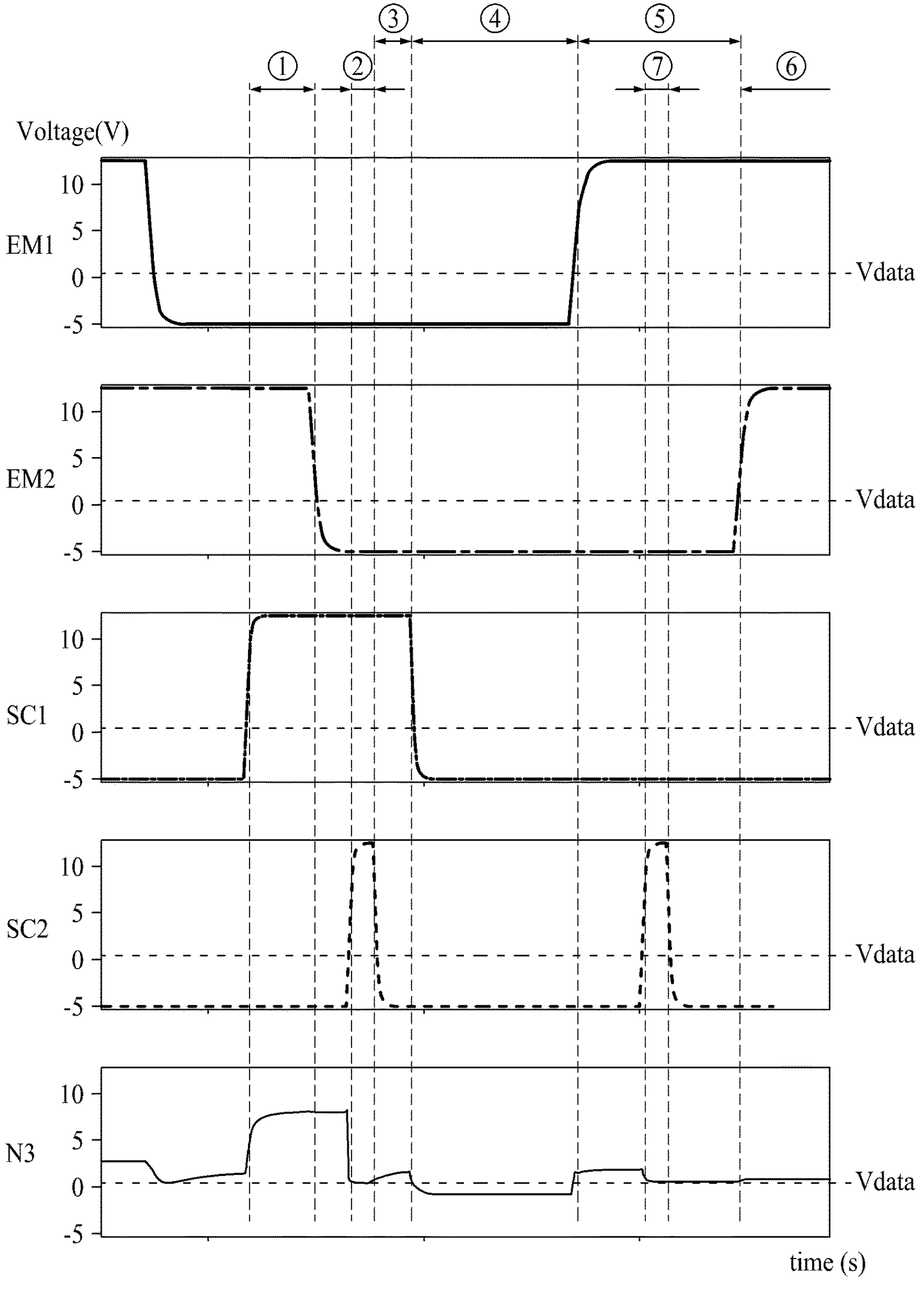
FIG. 4 is a waveform diagram of the gate signals of a pixel driving circuit and a voltage of a specific node according to another embodiment of the present disclosure.
Figure 5:
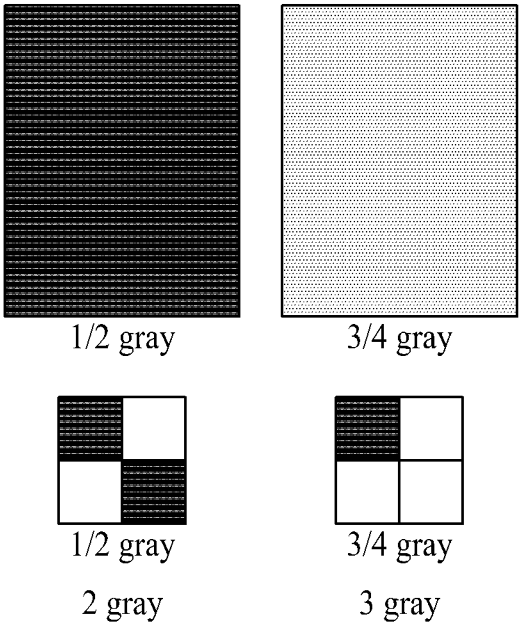
FIG. 5 is a diagram illustrating a dithering driving method according to an embodiment of the present disclosure.

FIG. 4 is a waveform diagram of gate signals of a pixel driving circuit and a voltage of a specific node according to another embodiment of the present disclosure, and FIG. 5 is a diagram illustrating a dithering driving method of a display device according to another embodiment of the present disclosure.

Referring to FIG. 4 in connection with FIG. 2, a pixel driving circuit according to another embodiment of the present disclosure can be driven while being divided into a first period ①, a second period ②, a third period ③, a fourth period ④, a fifth period ⑤, a sixth period ⑥, and a seventh period ⑦. For example, each of the subpixels SP arranged in the (n)th horizontal line can be written with the data voltage Data through the first to seventh periods ①, ②, ③, ④, ⑤, ⑥, and ⑦. The time of each of the first to seventh periods ①, ②, ③, ④, ⑤, ⑥, and ⑦ can be varied according to the embodiment of the present disclosure, but not limited thereto.

The gate signals input to the pixel driving circuit can include a first emission control signal EM1, a second emission control signal EM2, a first scan signal SC1, and a second scan signal SC2, which are applied through the gate lines GL.

The first emission control signal EM1 can have a gate high voltage of a first voltage level in the fifth and sixth ⑤ and ⑥, and can have a gate low voltage of a second voltage level different from the first voltage level in the first to fourth periods ①, ②, ③, and ④.

The second emission control signal EM2 can have the gate high voltage of the first voltage level in the first and sixth periods ① and ⑥, and can have the gate low voltage of the second voltage level in the second to fifth periods ②, ③, ④, and ⑤.

The first scan signal SC1 can have the gate high voltage of the first voltage level in the first to third periods ①, ②, and ③, and can have the gate low voltage of the second voltage level in the fourth to sixth periods ④, ⑤, and ⑥.

The second scan signal SC2 can have the gate high voltage of the first voltage level in the second and seventh periods ② and ⑦, and can have the gate low voltage of the second voltage level in the first, third, fourth and sixth periods ①, ③, ④, and ⑥. The seventh period ⑦ can be partially overlapped with the fifth period ⑤.

Except for the fifth period ⑤ and the portion of the seventh period ⑦ which is overlapped with the fifth period ⑤, the waveform diagram of FIG. 4 is identical to the waveform diagram of FIG. 3, whereby a description for the same parts will be omitted or may be briefly provided.

When the fifth period ⑤ starts, the first and second scan signals SC1 and SC2 and the second emission control signal EM2 can be maintained in the state of the gate low voltage, and the first emission control signal EM1 can rise to have the gate high voltage.

During the fifth period ⑤, according as the first emission control signal EM1 is changed to the gate high voltage, the fifth transistor T5 can be turned-on. At this time, the voltage of the fourth node N4 connected to the anode electrode of the light emitting element ED can be boosted while the potential difference (Data+Vth−Vini) between both ends of the storage capacitor Cst is maintained.

When the boosted voltage of the fourth node N4 is equal to or greater than the voltage value (for example, emission-enabled state) at which the driving current can flow through the light emitting element ED, the light emitting element ED can emit light. The minimum voltage value through which the driving current can flow through the light emitting element ED can be a voltage (EVSS+EVth) corresponding to a value which is high by the threshold voltage EVth of the light emitting element ED in the second driving voltage EVSS. In this case, when the applied data voltage Data is a black signal, the boosted voltage of the fourth node N4 does not exceed the threshold voltage EVth, so that the light emitting element ED may not emit light.

According to another embodiment of the present disclosure, the seventh period ⑦ for additionally applying the second scan signal SC2 can be included in the fifth period ⑤.

When the seventh period ⑦ starts, the second scan signal SC2 rises to have the gate high voltage, whereby the first emission control signal EM1 is maintained at the gate high voltage, and the first scan signal SC1 and the second emission control signal EM2 are maintained in the state of the gate low voltage.

During the seventh period ⑦, according as the first scan signal SC1 and the second emission control signal EM2 are maintained in the state of the gate low voltage, whereby the first, third, and fourth transistors T1, T3, and T4 are turned-off. According as the second scan signal SC2 is changed to the gate high voltage, the second transistor T2 is turned-on, whereby the data voltage Data can be additionally applied to the third node N3 corresponding to the source node of the driving transistor DT through the second transistor T2. In this case, since the fifth transistor T5 is turned-on, the data voltage Data is applied to the fourth node N4 by the first emission signal EM1 of the gate high voltage.

At this time, the voltage of the third node N3, which is unnecessarily increased by the applied data voltage Data, can be lowered. As shown in FIG. 4, when the data voltage Data is the black signal (0V), the data voltage Data of the black signal is additionally applied in the seventh period ⑦, so that the voltage of the third node N3 can be less than the voltage of the third node N3 by the pixel driving according to FIG. 3. In addition, since the voltage of the third node N3 is lowered through the seventh period ⑦, the boosted voltage of the fourth node N4 may not reach the threshold voltage threshold EVth of the light emitting element ED.

According to another embodiment of the present disclosure, as shown in FIG. 5, in the dithering driving method, the screen representation of the low grayscale level can be obtained by combining the subpixels SP arranged in the adjacent horizontal line instead of using only the subpixels SP arranged in the single horizontal line. For example, in the dithering driving method, when ½ gray is expressed based on pixels of 2×2, the grayscale level of the individual pixels is not adjusted, and the black data is applied to two subpixels of the 2×2 subpixels, thereby expressing ½ gray. For example, wheN¾ gray is expressed based on pixels of 2×2, ¾ gray can be represented by applying the black data to one of the subpixels of 2×2 without adjusting the grayscale of the individual pixels.

According to another embodiment of the present disclosure, in case of the dithering driving method, according as the second transistor T2 is turned on by the second scan signal SC2 in the seventh period ⑦, the data voltage Data is additionally applied, whereby it corresponds to the time point at which the black grayscale signal is applied to another horizontal line. Accordingly, the black grayscale signal can be applied to the pixel driving circuit without the separate additional line or transistor.

According to another embodiment of the present disclosure, the seventh period ⑦ for supplying the data voltage Data to the source node of the driving transistor DT can be additionally prepared in the fifth period ⑤ so that the voltage of the third node N3, which is increased by the expansion of the sampling period due to the third period ③, can be lowered. Accordingly, even if the sampling period is expanded, it is possible to prevent the light emitting element ED from being undesirably emitted. Particularly, when the data voltage Data is the black signal, in which the light emission is easily recognized, the light emitting element ED is not emitted, thereby realizing a clearer black screen.

Figure 6:
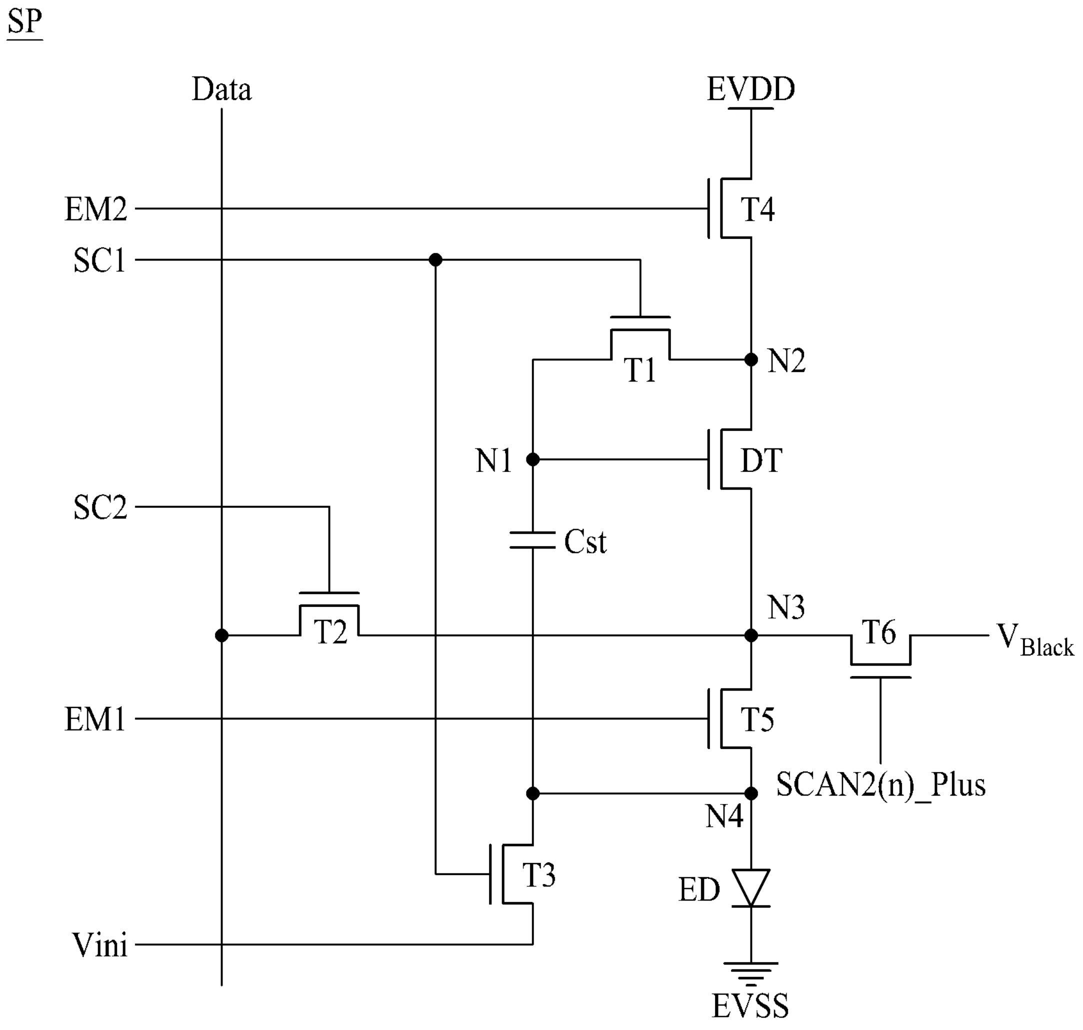
FIG. 6 is a circuit diagram of a pixel driving circuit and a light emitting device according to another embodiment of the present disclosure.

A pixel driving circuit according to another embodiment of the present disclosure will be described with reference to FIG. 6. The pixel driving circuit according to another embodiment of the present disclosure shown in FIG. 6 is different from the embodiment shown in FIG. 2 in that the pixel driving circuit further includes a transistor for applying a black grayscale level signal. Hereinafter, a pixel driving circuit according to another embodiment of the present disclosure shown in FIG. 6 will be described focusing on a configuration different from the embodiment illustrated in FIG. 2.

FIG. 6 is a circuit diagram of a pixel driving circuit and a light emitting device according to another embodiment of the present disclosure.

Referring to FIG. 6, the pixel driving circuit according to another embodiment of the present disclosure can further include a sixth transistor T6 disposed between a third node N3 and a line to which a black data voltage $V_{Black}$ representing a black grayscale is applied.

The sixth transistor T6 can be controlled by a second scan signal SC2, and can be connected between a line to which the black data voltage is applied and a third node N3. The sixth transistor T6 can include a gate electrode, a drain electrode (or first source/drain electrode), and a source electrode (or second source/drain electrode). The gate electrode (or gate node) of the sixth transistor T6 can be applied with the second scan signal SC2_P, the drain electrode (or drain node) can be applied with the black data voltage $V_{Black}$, and the source electrode (or source node) can be connected to the third node N3.

According to another embodiment of the present disclosure, a seventh period ⑦ can be performed through the sixth transistor T6. In this case, the second scan signal SC2_P is the same as the waveform in the seventh period ⑦, and the second scan signal SC2_P maintains a gate low voltage in the remaining periods except for the seventh period ⑦.

Figure 7:
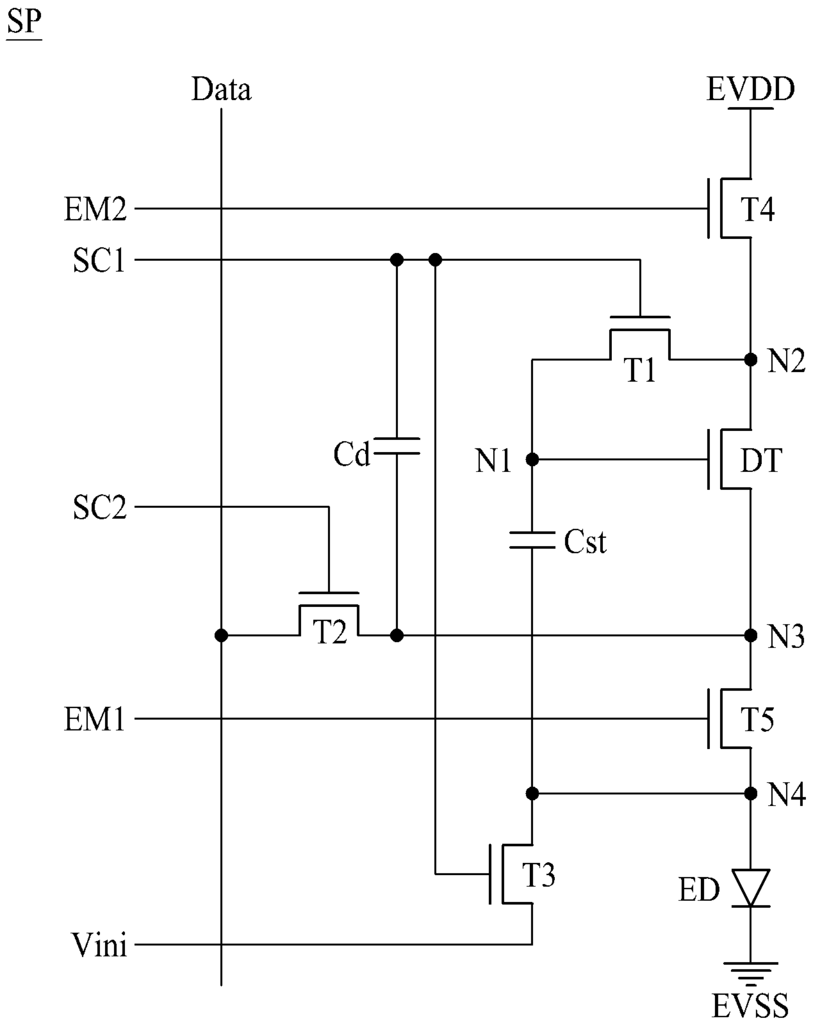
FIG. 7 is a circuit diagram of a pixel driving circuit and a light emitting device according to another embodiment of the present disclosure.

A pixel driving circuit according to another embodiment of the present disclosure will be described with reference to FIG. 7. The pixel driving circuit according to another embodiment of the present disclosure illustrated in FIG. 7 is different from the embodiment illustrated in FIG. 2 in that the pixel driving circuit further includes a capacitor Cd between a first scan signal line SC1 and the second scan signal line SC2. Hereinafter, the pixel driving circuit according to another embodiment of the present disclosure shown in FIG. 7 will be described focusing on a configuration different from the embodiment illustrated in FIG. 2.

FIG. 7 is a circuit diagram of a pixel driving circuit and a light emitting device according to another embodiment of the present disclosure.

Referring to FIG. 7, the pixel driving circuit according to another embodiment of the present disclosure can further include a capacitor Cd between a line for applying a first scan signal SC1 and a line for applying a second scan signal SC2.

The capacitor Cd can be connected between a third node N3 and a gate node of a first transistor T1. During an operation of a seventh period ⑦, the capacitor Cd can additionally reduce a voltage of the third node N3 by a coupling effect.

The display device according to the embodiment of the present disclosure can be described as follows.

The display device according to an embodiment of the present disclosure can include a light emitting element, and a pixel driving circuit connected to the light emitting element and configured to include first to fourth nodes, the pixel driving circuit can include a driving transistor connected to the first to third nodes, a first transistor connected to a first scan signal line and connected between the first node and the second node, a second transistor connected to a second scan signal line and connected between the third node and a data line, a third transistor connected to the first scan signal line and connected between the first node and an initialization voltage line, a fourth transistor connected to a second emission control line and connected between the second node and a first driving voltage line, a fifth transistor connected to a first emission control line and connected between the third node and the fourth node, and a storage capacitor disposed between the first node and the fourth node, the second scan signal can be applied one or more times through the second scan signal line during one frame period.

In the display device according to an embodiment of the present disclosure, a time point at which the second scan signal can be applied includes a time point of applying the first scan signal and a time point of applying the second scan signal, and a data voltage at the time point of applying the second scan signal can be a black data voltage.

In the display device according to an embodiment of the present disclosure, the data voltage at the time point of applying the first scan signal can be a data voltage for displaying an actual image.

In the display device according to an embodiment of the present disclosure, the time point of applying the first scan signal can be earlier than the time point of applying the second scan signal.

In the display device according to an embodiment of the present disclosure, the data voltage at the time point of applying the second scan signal can be equal to or lower than that of the data voltage at the time point of applying the first scan signal.

In the display device according to an embodiment of the present disclosure, the pixel driving circuit can be driven in first to sixth periods, the first scan signal through the first scan signal line can have a first voltage level in the first to third periods, and have a second voltage level lower than the first voltage level in the fourth to sixth periods, the second scan signal through the second scan signal line can have the first voltage level in the second period, the first emission control signal through the first emission control line can have the first voltage level in the fifth and sixth periods, and have the second voltage level in the first to fourth periods, and the second emission control signal through the second emission control line can have the first voltage level in the first and sixth periods, and have the second voltage level in the first to fifth periods.

In the display device according to an embodiment of the present disclosure, the pixel driving circuit can further include a seventh period overlapped with any one of the first to sixth periods.

In the display device according to an embodiment of the present disclosure, during the seventh period, the second scan signal can have the first voltage level.

In the display device according to an embodiment of the present disclosure, the second scan signal can have the first voltage level in the second and seventh periods, and have the second voltage level in the first, third, fourth, and sixth periods.

In the display device according to an embodiment of the present disclosure, the seventh period can be partially overlapped with the fifth period.

In the display device according to an embodiment of the present disclosure, can further include a plurality of pixel driving circuits included in each of horizontal lines, the pixel driving circuit included in any one of the horizontal lines can be applied with the second scan signal one or more times during one frame, and a time point at which the second scan signal can be additionally applied corresponds to a time point at which the black data voltage is applied to the pixel driving circuit included in another one of the horizontal lines.

In the display device according to an embodiment of the present disclosure, the pixel driving circuit can further include a sixth transistor disposed between the third node and the black data voltage.

In the display device according to an embodiment of the present disclosure, the sixth transistor can be connected to the second scan line.

In the display device according to an embodiment of the present disclosure, can further include a capacitor formed between the first scan signal line and the third node.

In the display device according to an embodiment of the present disclosure, during one frame period, the time point at which the second scan signal is additionally applied can be overlapped with the period in which the first emission control signal through the first emission control line has the first voltage level, and may be not overlapped with the period in which the second emission control signal through the second emission control line has the first voltage level.

In the display device according to an embodiment of the present disclosure, during one frame period, the time point at which the second scan signal is additionally applied can be provided between the time point at which the first emission control signal through the first emission control line is changed to the first voltage level and the time point at which the second emission control signal through the second emission control line is changed to the first voltage level.

In the display device including the pixel driving circuit according to the present disclosure, the sampling period is sufficiently secured and the voltage of the source node of the driving transistor is lowered before the light emitting period so that it is possible to overcome defects of image quality such as stain, afterimage, and crosstalk and to improve the black grayscale.

It will be apparent to those skilled in the art that various substitutions, modifications, and variations are possible within the scope of the present disclosure without departing from the spirit and scope of the present disclosure. Therefore, the scope of the present disclosure is represented by the following claims, and all changes or modifications derived from the meaning, range and equivalent concept of the claims should be interpreted as being included in the scope of the present disclosure.

What is claimed is:

1. A display device comprising:

a light emitting element; and a pixel driving circuit connected to the light emitting element and configured to include first to fourth nodes, wherein the pixel driving circuit includes:

a driving transistor connected to the first to third nodes;

a first transistor connected to a first scan signal line and connected between the first node and the second node;

a second transistor connected to a second scan signal line and connected between the third node and a data line;

a third transistor connected to the first scan signal line and connected between the first node and an initialization voltage line;

a fourth transistor connected to a second emission control line and connected between the second node and a first driving voltage line;

a fifth transistor connected to a first emission control line and connected between the third node and the fourth node; and a storage capacitor disposed between the first node and the fourth node, wherein a second scan signal is applied one or more times through the second scan signal line during one frame period, wherein a time point at which the second scan signal is applied includes a first time point of applying the second scan signal and a second time point of applying the second scan signal, and wherein a data voltage at the second time point of applying the second scan signal is a black data voltage.

2. The display device according to claim 1, wherein the data voltage at the first time point of applying the second scan signal is a data voltage for displaying an actual image.

3. The display device according to claim 1, wherein the first time point of applying the second scan signal is earlier than the second time point of applying the second scan signal.

4. The display device according to claim 2, wherein the data voltage at the second time point of applying the second scan signal is equal to or lower than that of the data voltage at the first time point of applying the second scan signal.

5. The display device according to claim 1, wherein the pixel driving circuit is driven in first to sixth periods, a first scan signal through the first scan signal line has a first voltage level in the first to third periods, and has a second voltage level lower than the first voltage level in the fourth to sixth periods, the second scan signal through the second scan signal line has the first voltage level in the second period, a first emission control signal through the first emission control line has the first voltage level in the fifth and sixth periods, and has the second voltage level in the first to fourth periods, and a second emission control signal through the second emission control line has the first voltage level in the first and sixth periods, and has the second voltage level in the second to fifth periods.

6. The display device according to claim 5, wherein the pixel driving circuit further operates in a seventh period overlapped with any one of the first to sixth periods.

7. The display device according to claim 6, wherein, during the seventh period, the second scan signal has the first voltage level.

8. The display device according to claim 7, wherein the second scan signal has the first voltage level in the second and seventh periods, and has the second voltage level in the first, third, fourth, and sixth periods.

9. The display device according to claim 8, wherein the seventh period is partially overlapped with the fifth period.

10. The display device according to claim 1, further comprising a plurality of pixel driving circuits included in each of horizontal lines, wherein the pixel driving circuit included in any one of the horizontal lines is applied with the second scan signal one or more times during one frame, and a time point at which the second scan signal is additionally applied corresponds to a time point at which the black data voltage is applied to the pixel driving circuit included in another one of the horizontal lines.

11. The display device according to claim 1, wherein the pixel driving circuit further includes a sixth transistor disposed between the third node and the black data voltage.

12. The display device according to claim 11, wherein the sixth transistor is connected to the second scan line.

13. The display device according to claim 1, further comprising a capacitor disposed between the first scan signal line and the third node.

14. The display device according to claim 1, wherein, during one frame period, the time point at which the second scan signal is additionally applied is overlapped with the period in which a first emission control signal through the first emission control line has a first voltage level, and is not overlapped with the period in which a second emission control signal through the second emission control line has the first voltage level.

15. The display device according to claim 1, wherein, during one frame period, the time point at which the second scan signal is additionally applied is provided between the time point at which a first emission control signal through the first emission control line is changed to a first voltage level and the time point at which a second emission control signal through the second emission control line is changed to the first voltage level.

16. A display device comprising:
a light emitting element; and
a pixel driving circuit connected to the light emitting element and configured to include first to fourth nodes,
wherein the pixel driving circuit includes:
a driving transistor connected to the first to third nodes;
a first transistor connected to a first scan signal line and connected between the first node and the second node;
a second transistor connected to a second scan signal line and connected between the third node and a data line;
a third transistor connected to the first scan signal line and connected between the first node and an initialization voltage line;
a fourth transistor connected to a second emission control line and connected between the second node and a first driving voltage line;
a fifth transistor connected to a first emission control line and connected between the third node and the fourth node; and
a storage capacitor disposed between the first node and the fourth node,
wherein a second scan signal is applied one or more times through the second scan signal line during one frame period, and
wherein the display device further comprises a capacitor disposed between the first scan signal line and the third node.

17. A display device comprising:
a light emitting element; and
a pixel driving circuit connected to the light emitting element and configured to include first to fourth nodes,
wherein the pixel driving circuit includes:
a driving transistor connected to the first to third nodes;
a first transistor connected to a first scan signal line and connected between the first node and the second node;
a second transistor connected to a second scan signal line and connected between the third node and a data line;
a third transistor connected to the first scan signal line and connected between the first node and an initialization voltage line;
a fourth transistor connected to a second emission control line and connected between the second node and a first driving voltage line;
a fifth transistor connected to a first emission control line and connected between the third node and the fourth node; and
a storage capacitor disposed between the first node and the fourth node,
wherein a second scan signal is applied one or more times through the second scan signal line during one frame period, and
wherein, during one frame period, a time point at which the second scan signal is additionally applied is overlapped with the period in which a first emission control signal through the first emission control line has a first voltage level, and is not overlapped with the period in which a second emission control signal through the second emission control line has the first voltage level.

* * * * *